Oct. 13, 1942.                G. DALKOWITZ                2,298,872
                                DRY SHAVER
                            Filed Aug. 10, 1938              4 Sheets-Sheet 1

INVENTOR.
Godfrey Dalkowitz
BY
ATTORNEYS

Oct. 13, 1942.  G. DALKOWITZ  2,298,872
DRY SHAVER
Filed Aug. 10, 1938  4 Sheets-Sheet 2

INVENTOR.
BY Godfrey Dalkowitz
ATTORNEYS

Oct. 13, 1942.　　G. DALKOWITZ　　2,298,872
DRY SHAVER
Filed Aug. 10, 1938　　4 Sheets-Sheet 3

INVENTOR.
Godfrey Dalkowitz
BY
ATTORNEYS

Oct. 13, 1942.    G. DALKOWITZ    2,298,872
DRY SHAVER
Filed Aug. 10, 1938    4 Sheets-Sheet 4

INVENTOR.
Godfrey Dalkowitz
BY
ATTORNEYS

Patented Oct. 13, 1942

2,298,872

UNITED STATES PATENT OFFICE 2,298,872

DRY SHAVER

Godfrey Dalkowitz, Brooklyn, N. Y., assignor to American Safety Razor Corporation, Brooklyn, N. Y., a corporation of Virginia Application August 10, 1938, Serial No. 224,017

19 Claims. (Cl. 30—43)

This invention relates in general to dry shavers, that is, to shaving devices in which the shaving operation is effected without preparatory treatment of the flesh as by shaving creams or the like.

One of the problems in shaving arises from the fact that different areas of the face require different manners of treatment in the shaving operation. This is due (a) as to a particular individual, to the constantly changing contour of the areas to be shaved, the differences in the various areas, of the angles of growth, the stiffness and the thickness of the hairs to be cut and (b) to the variations in these characteristics between different individuals.

Another problem that has been met is that of the close shave generally desired by most people and attempts hitherto made to this end have caused an irritation which has been the subject of marked comment in medical circles.

One of the objects of my invention is the provision of an arrangement which will meet these problems, and this I accomplish by providing a shaving arrangement comprising portions which vary in their shaving action and operate either simultaneously or successively to meet the varying conditions as aforementioned in an effective way.

Another object of my invention is to provide hair cutting portions which will shave more effectively than hitherto and one of the arrangements herein shown for attaining this objective is the provision of relatively movable cutting edges formed on spirals of the same pitch.

Some of the factors which determine the commercialization and effectiveness of a shaver of this type, are the dimensions of the shaving head and the contours of the face engaging area thereof, and another object of my invention is the provision of an arrangement wherein the face engaging area of the shaver is dimensioned and contoured for effective face engaging purposes.

The head of a dry shaver comprises generally a stationary member which engages the face and a movable member which cuts or shears off the hair. The function of the face engaging member is to present the hairs so that they may be most effectively cut by the movable member and for this purpose it is provided with hair engaging and guiding openings or slots. The functioning of the movable or cutting member is determined by the characteristics of its cutting edges and their relationship to the openings or slots in the stationary member as the cutting member is given its throw.

It is therefore one of the objects of my invention to provide a stationary member which will effectively serve to pick up and present hairs for cutting by the movable member.

Another object of my invention is the provision of a movable member, the cutting edges of which serve effectively for shearing off the hairs so presented.

It is a further object of my invention to so construct and relate the slots and openings in the stationary and movable members so as to give a variation in the cutting operation which parallels the aforementioned varied requirements and as will be understood when the specification is read among the provisions for this purpose are (a) cooperating cutting edges cutting some at one angle and some at another angle; (b) cutting areas, some of which cut the hairs to give what is known as a clean shave, and others which give these cut hairs a further cut to convert the clean shave into a close shave.

The general object of my invention is the provision of a device for dry shaving that is simple, effective and reliable, and that is low in cost of manufacture and maintenance.

For the attainment of these objects and such other objects as may hereinafter appear or be pointed out, I have illustrated embodiments of my invention in the drawings, wherein.

The features of my invention will be understood from the description of the various embodiments which will now be described in detail.

In Figures 1 to 5 inclusive, I have illustrated one embodiment of the shaving head in which the outer or face engaging member has the reference character 40 applied thereto, and I will here state that the embodiment illustrates a type in which the movable cutter oscillates in a direction transverse to the longitudinal axis of the shaving head.

The shear plate 40 has its upper or face engaging portion 42 arched as shown in these various figures, and slotted as indicated at 44 to provide the teeth 45 intermediate the slots 44.

The slots 44, it will be observed, are spirally contoured and the portions of their sides adjacent the interior surface of the shear plate are formed into spiral cutting edges 46. In the embodiment of these figures, the slots 44 are shown as arranged in two lateral rows spaced from each other by an intermediate solid portion 48.

Upon viewing Figure 5, it will be observed that the arrangement of the two sets of slots separated by the solid portion 48 provides not only the aforementioned cutting edges 46 but also other cutting edges 50, and the purpose of which will be more fully set forth hereinafter. These edges 50 are shown as extending longitudinally, that is axially in relation to the spiral cutting edges 46 but it will be understood that they can take an angular position with relation to the spiral edges 46, other than that specifically shown in this figure of the drawings.

The inner surface of the shear plate is cylindrical so that the cylindrical outer surface portions of an oscillating cutting member can slide thereover, for which purpose the radii of the inner surfaces of the shear plate and the cylindrical surfaces of the cutter are made substantially identical.

Figure 2:
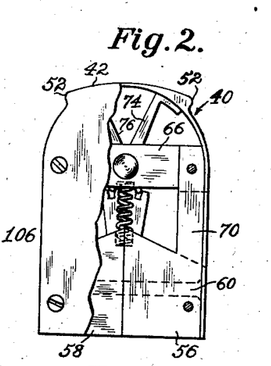
Figure 2 is an end view of the embodiment of Figure 1 with portions broken away.
Figure 4:
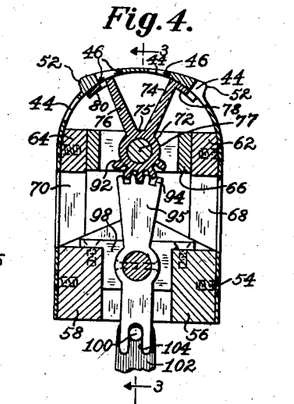
Figure 4 is a transverse sectional view substantially on the line 4—4 of Figures 1 and 3, looking in the direction of the arrows.

At its middle portion the shearplate is made relatively thin, as clearly appears from Figures 2 and 4, so that a close shave may be obtained, because, since the hair is cut at the inner surface of the shear plate, a clipping very close to the skin may be obtained. The shear plate is shown as increasing in thickness outwardly from its central portion to provide portions serving as guards and to guide the hairs into position to be cut. The guard portion ends in shoes 52, beyond which the thickness of the shear plate is suddenly reduced. The slots 44 extend downward beyond the shoes 52 for a considerable distance to provide slot extensions serving to admit and guide hairs into cutting position. This arrangement is particularly effective for long hairs. These slot extensions serve additionally for the discharge of debris. The member 40 is provided with downwardly extending walls secured to the supporting frame of the shaver head in any suitable or preferred manner, as for instance by screws 54 (see Figure 4).

The body portion of the shaver head is shown as comprising two lateral members 56 and 58 held together in any suitable or preferred manner as for instance by a rivet 60, and each of these members is provided with upstanding side portions 62 and 64 spaced from each other so as to provide a guideway for a vertically slidable frame 66 that serves for the support of the movable cutter as will be hereinafter explained. The side portions 62 and 64 have lateral openings 68 and 70 formed therein that serve for the discharge of waste entering the lower portions of the shaver head.

The movable cutter is mounted on a pintle 72 carried in the aforementioned frame 66. In the embodiment of Figures 1 to 5, the cutter is shown as provided with two sets of arms 74 and 76 extending outwardly from a hub 77 surrounding the pintle 72, from the outer ends of which extend in opposite direction, the cutting portions 78 and 80 having cylindrical outer surfaces adapted to bear against the inner cylindrical surface of the shear plate, as already mentioned hereinabove.

Figure 5:
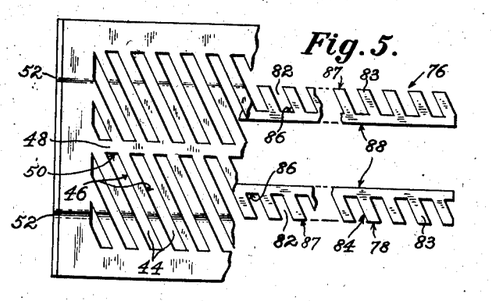
Figure 5 is a fragmentary view in developed form of the shear plate and the cutter of the embodiment of Figure 1.

As may be seen from the developed view of the cutter in Figure 5 the portions 76 and 78 are each traversed by spiral slots 82 and thereby spiral teeth 83 having spiral cutting edges 84 are formed, the latter being adapted to cooperate with the spiral cutting edges 46 of the shear plate to effect the clipping action. It will be observed from Figure 5 that the slots 82 are closed at their inner ends to provide cutting edges 86 extending at an angle to the spiral edges 84, and similarly the outer edges 87 of the teeth 83 may serve as cutting edges, all as will be more fully pointed out herein. In Figure 5 these edges 86 and 87 are shown as running in an axial direction in relation to the spirals as are the corresponding edge 50 on the shear plate. The adjacent edges 88 which run along the inner edge of each of the cutting areas 86 and 88 may also serve as cutting edges as will here also be more fully explained.

It is a feature of my invention that the spiral edges 46 of the shear plate be pitched identically with the spiral edges 84 of the cutter.

It will be observed that as the cutter oscillates, the spiral cutting edges 46 of the shear plate and the spiral edges 84 of the cutter will pass over each other and that, because of their identical pitch, they will meet along their entire length at the same instant so that the action may be compared to a clipping action rather than to the shearing action such as found in a pair of scissors in which the cutting edges are in contact at only one point of their length at any given instant this point travelling progressively along the edges. However, it will further be observed that, because of the inclination of the spiral edges to the direction of movement of the cutter, the movement of the edges 46 and 84 is not a direct movement of one toward the other, but may be compared to a tangential or slicing cutting.

The longitudinally disposed edges 50 of the shear plate and the correspondingly disposed edges 83 and 86 of the cutter similarly cooperate and where they are parallel to the axis of oscillation as in Figure 5 they will move directly towards each other and also effect a clipping as distinguished from a scissors shearing action.

In addition, it will be observed that the edges 83 and 86 may cooperate in a scissors action with the spiral edges 46 and the edges 50 may cooperate in a scissors action with the edges 84.

Similarly the edges 88 may cooperate with the edges 50 and 46.

It will be observed that the oscillation of the cutter may be made of such an extent that each of the portions 76 and 78 will swing past the middle rib 48 of the shear plate so that the portion 76 for example will cooperate in a cutting action with the lower half of the shear plate as shown in Figure 5, as well as with the upper half. Similarly, the portion 78 may be made to cooperate with both the lower or the upper half of the shear plate as shown in Figure 5. By limiting the oscillation of the cutter, the portion 76 can be made to cooperate with only one half of the shear plate and the cutter 78 with the other half.

It will be observed that in Figure 5, in which the cutter is shown in its central position, the slots of the cutter are disposed directly underneath the slots of the shear plate, and it will further be observed that the spacings of the slots of the shear plate and of the cutter are identical. The effect of this construction will be that the cutting action is symmetrical about the central position of the cutter, and further that when the spiral edges interact to effect the cutting, all the pairs of edges will be active at the same instant.

It will be understood of course that my invention also contemplates a different spacing of the teeth of the cutter from that of the shear plate, in which event the cutting action will be distributed in time, as one pair of spiral edges after the other comes into action. It may further be found of advantage for certain purposes not to have the cutting symmetrical in relation to the middle position. This might be effected by having the slots of the cutter, when in its middle position displaced from those of the shear plate. Other possibilities will be found disclosed in Figure 10, which will be described more in detail hereinafter.

The mounting of the cutter in the vertically slidable frame 66 has been described hereinabove. As the frame 66 moves upward the cutter will come into contact with the shear plate. In order to maintain this contact, which is obviously necessary for the proper functioning of the dry shaver, I have shown means for urging the cutter upward against the shear plate. This means may be of any suitable or preferred form. For example, I have shown a pair of coil springs 90 seated in recesses in the members 56 and 58 at their lower ends, and bearing against the frame 66 at their upper ends. It will be observed that as a result of this construction any wear of the shear plate or the cutter will be taken up and its effective operation insured at all times.

In Figure 4 I have shown one arrangement for oscillating the cutter. This comprises gear teeth 92 on the hub 75 of the cutter meshing with the gear teeth 94 on a lever 95 pivotally mounted within the shaving head, as for example, on a rock shaft 96 journalled in bearings 98 carried by the members 56 and 58. Oscillation of the lever 95 may be effected in any suitable or preferred manner, as by a pin 100 carried by an oscillating member 102 and engaging a slot 104 in the lever 95.

The ends of the shaver head may be closed as by plates 106. However, if additional openings are needed for the discharge of waste other than the lateral openings 70 and the downwardly extending ends of the slots 46 of the shear plate, the plates 106 may be omitted in whole or in part.

Figure 6:
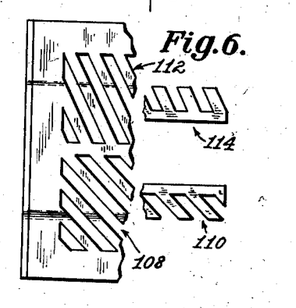
Figure 6 is a view similar to Figure 5 showing a modified form of shear plate and cutter.

In Figure 6 I have shown a modified form of shear plate and cutter in which it will be observed that the spiral slots of the two halves both of the cutter and the shear plate are differently pitched, the lower portion of each, numbered 108 and 110 respectively, being shown as of steeper pitch than its upper portion, these upper portions being numbered 112 and 114 respectively. Different cutting effects will therefore be obtained on the two halves due to the difference in pitch. It will further be observed that in this form when the throw of the cutter is arranged that each half passes beyond its mid-position, the cutting will be effected in part by paired spiral edges that are no longer of the same pitch, so that a scissors action will take place, rather than the clipping action that takes place when the spiral edges of cutter and shear plate have the same pitch. This construction may be found preferable for certain purposes.

A second embodiment of my invention is illustrated in Figures 7, 8, 9 and 10. Before proceeding to a detailed description of this embodiment, it will be pointed out that it differs from the first embodiment in that the cutter is mounted for oscillation in the main or body portion of the shaving head instead of in a member movable in said body portion, and that it is the shear plate which is mounted for movement downwardly into engagement with the cutter. It will further be observed that the contacting surfaces of the shear plate and cutter are formed on a larger radius than are the corresponding parts of the first embodiment and that the arc of oscillation of the cutter is comparatively limited.

Figure 10:
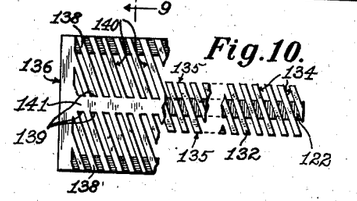
Figure 10 is a fragmentary developed view of the shear plate and cutter of the embodiment of Figure 7.

As to the cutting areas of the shear plate and the cutter, it will be observed on referring to Figure 10 that the cutter is shown as provided only with a single cutting area as compared with the two spaced cutting areas of the shear plate, and that the spiral cutting edges of the cutter are in staggered relation to the spiral cutting edges of both halves of the shear plate, when the cutter is in its mid-position, as illustrated in Figure 10. It will further be noted that the spiral cutting edges of both halves of the shear plate are staggered in relation to each other.

In Figures 7 to 10, 120 designates the body portion of the shaver head on which is mounted for oscillation a cutter 122. This mounting is shown by way of example in the form of trunnions 124 engaging depressions in the rock shaft 125 which carries the cutter, and which rock shaft is provided with a crank arm 126 by means of which it may be oscillated.

The trunnions 124 are shown as threaded and fitting into complementary threaded portions in the body 120, whereby the trunnions may be adjusted.

Movement may be imparted to the crank 126 in any suitable or preferred manner. As illustrated by way of example, the construction includes a lever 130 provided with a crank pin 128 fitting into a slot 127 in the crank arm 126.

The cutter 122 is provided with a cutting portion having spiral teeth 132 that extend transversely of the cutter and outwardly from the supporting plate thereof, and these teeth are provided with spiral cutting edges 134 on the side walls thereof. This construction is clearly shown in Figure 10. Additional cutting edges 135 are shown on the ends of the teeth 135 and extend at an angle to the spiral edges.

Slidably mounted on the body portion for movement toward and away from the cutting portion of the cutter 122 is a shear plate 136 provided with two rows of spiral teeth 138 having spiral cutting edges 140 extending laterally outward in opposite directions from a central rib 141. It will be observed that the pitch of the edges 140 is identical with that of the edges 134 of the cutter. Additional cutting edges extending at an angle to the spiral edges are shown at 139.

That the spiral cutting edges 140 of the two halves of the shear plate may be staggered with relation to each other and to the spiral cutting edges 134 of the cutter, has already been adverted to hereinabove.

Depending from the shear plate are a pair of walls 142 having their inner surfaces in sliding engagement along the sides of the body 120, whereby the shear plate is guided to move toward and away from the cutter.

In order to maintain contact between the inner surface of the shear plate and the outer surface of the cutter, which is necessary for the cutting action, I have shown, by way of example, a leaf spring 144 carried by a member 146 shown as secured to the extensions 142 in any suitable or preferred manner as by the screws 148. The ends of the spring press against an abutment 149 on the body portion 120 of the cutter, thus tending to press the shear plate downwardly.

Figure 7:
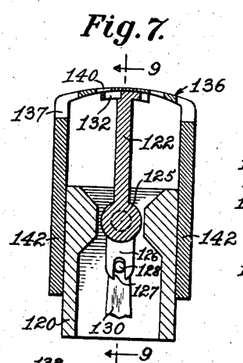
Figure 7 is a transverse sectional view through a second embodiment of my invention, this view being taken substantially on the line 7—7 of Figure 9, looking in the direction of the arrows.
Figure 8:
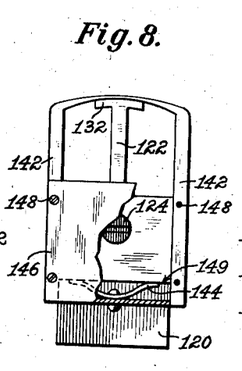
Figure 8 is an end view, with portions broken away, of the embodiment of Figure 7.
Figure 9:
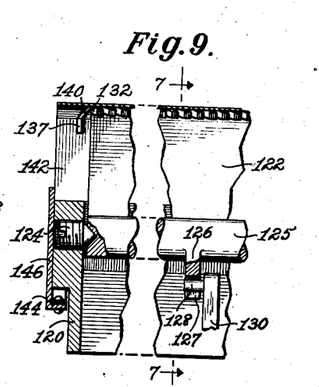
Figure 9 is a longitudinal sectional view of the embodiment of Figure 7 taken substantially on the line 9—9 of Figure 7, and looking in the direction of the arrows.

It may further be pointed out that waste discharge in this embodiment is effected through the ends of the shaving head which are open at their upper portions 142, and also through the slots between the teeth 138 of the shear plate, these slots having portions 137 extending a substantial distance downward into the lateral walls 142, as clearly appears from Figure 7 and the left hand portion of Figure 9.

Figure 3:
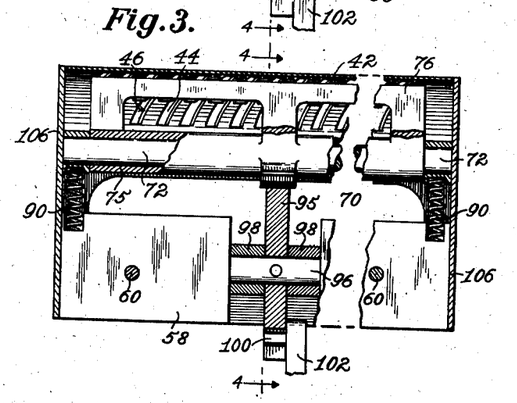
Figure 3 is a fragmentary longitudinal sectional view substantially on the line 3—3 of Figure 4, looking in the direction of the arrows.
Figure 11:
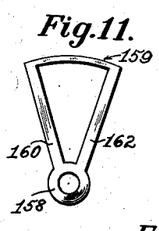
Figure 11 is an end view of a modified form of cutter.
Figure 12:
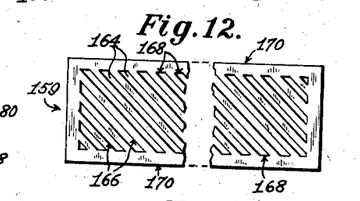
Figure 12 is a fragmentary developed view of the cutting portion of the cutter of Figure 11.

In Figures 11 and 12 I have shown an end elevational view and a developed view of the cutting area respectively of a modified form of an oscillating cutter adapted for use with any of the embodiments herein disclosed, and having features advantageous for particular purposes. It will be observed that in the cutting area or surface 159 of the cutter of Figure 11, the cutting edges are formed between two supports 160 and 162 carried by a hub 158. The supports or supporting arms 160 and 162 may be in the form of longitudinally extending plates such as the single supporting arm shown in Figure 9, or they may be a series of arms or a plate provided with openings therein such as shown in Figures 3 and 4. The cutting area 159 shown in developed form in Figure 12 comprises spiral slots 164 having spiral cutting edges 166 on their side walls and other cutting edges 168 positioned at an angle to the spiral slots and located on the ends of the slots 164. Other cutting edges 170 also at an angle with the spiral slots may be provided on the outside of the cutting area. Where this cutter is used with a shear plate also provided with spiral cutting edges, the spiral edges of the cutter and of the shear plate may be of the same pitch.

Figure 13:
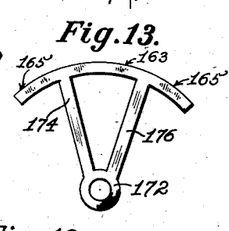
Figure 13 is an end view of another form of cutter.
Figure 14:
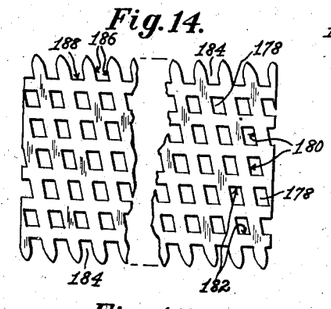
Figure 14 is a fragmentary developed view of the cutting portion of the cutter of Figure 13.

In Figures 13 and 14 I have shown another form of oscillating cutter that is adapted for use with any of the embodiments herein disclosed. In this form a portion 163 of the cutting area is positioned between two arms 174 and 176 that may be similar to arms 160 and 162 of Figure 11 and are carried by a hub 172, and other portions 165 of the cutting area are shown as extending to the outside of each of said arms 174 and 176. The cutting area of this form of cutter is shown in developed form in Figure 14. It will be observed that it is provided with openings 178 arranged in spiral rows and provided at their sides with spirally disposed cutting edges 180, and at their ends with cutting edges 182 positioned at an angle to the spiral cutting edges. Each row of openings 178 has associated therewith at both ends the open slots 184 that are shown as flaring outwardly, and as provided with cutting edges 186 that at their inner portions are continuations of the spiral cutting edges 180 of the openings 178 but at their outer portions depart from the spiral contour, and further with cutting edges 188 disposed, like the edges 182, at an angle to the spiral edges. This form of cutter resembles the cutter of Figures 11 and 12 in having two arms but adds thereto the cutting areas outside the arms and the numerous edges running at an angle to the spiral cutting edges. Where this form of cutter is used with a shear plate having spiral cutting edges the spirals of the cutter and shear plate may be of the same pitch.

Figure 15:
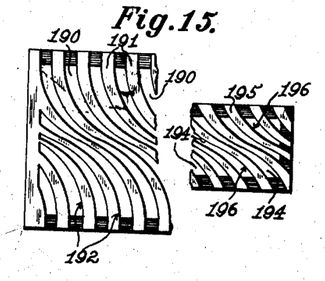
Figures 15 and 16 are respectively fragmentary developed views of the cutting portions of still other forms of cutters.

In Figure 15 I have shown another modified form of cutter together with a modified form of shear plate, both in developed form. In this figure the numeral 190 designates slots on the shear plate that run across the shear plate some-what in the fashion of the spiral slots of Figure 5 but instead of the slots being uniformly pitched their pitch varies from point to point. For these reasons I may describe these slots as "variably pitched spirals" in contour.

The solid portions 191 intermediate the slots 190 are provided with variably pitched spiral cutting edges along their sides and it will be observed that these slots are symmetrical about a central longitudinal axis where their pitch is a maximum. The pitch of the slots decreases toward the outer edges of the shear plate where it is substantially zero.

The cutter is provided with variably pitched slots 194 and the intermediate solid portions 195 are formed with variably pitched spiral cutting edges 196 at their sides. For certain purposes the contour of the cutting edges of the cutter may be made identical with that of the cutting edges of the shear plate at its mid portion, and they are so shown in Figure 15. This is not necessarily so as the contours of the cutting edges of the cutter and the shear plate may differ. Where the contours are identical in portions thereof, the identical portions need not necessarily be in registration when the cutter is in its mid portion, as shown in Figure 15.

The effect produced thereby will resemble that of a construction in which the cutting members are provided with areas in which the spiral slots have different pitches such as for example shown in Figure 6. At the mid portion where the pitch is steep the effect will approach that due to the cutting edges set at an angle to the spiral edges, such as the edges 50 of Figure 5.

Figure 16:
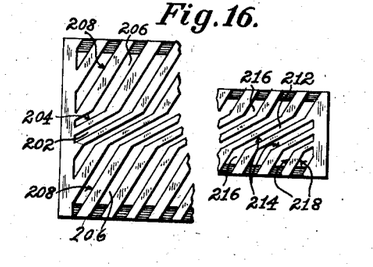

The construction of the shear plate and the cutter shown in developed form in Figure 16 resembles that of Figure 15, but instead of variably pitched spiral slots, the slots of this modification each consist of a plurality of spiral segments of different pitches. The central portion of each slot is steeply pitched and to either side of said steeply pitched portion each slot has a portion less steeply pitched. While I have shown each slot as comprised of three zones or segments it will be obvious that any number of zones or segments might be used for each slot and that the pitches of the two end segments need not necessarily be identical as shown in Figure 16.

In Figure 16, 202 designates the central steeply pitched section of the slots and 204 the spiral cutting edges thereof, while 206 designates the lateral or end sections of the slots that are of lower pitch, and 208 designates the cutting edges thereof. The steeply pitched central portions of the slots of the oscillating cutter are designated by the numeral 212, while 214 designates the cutting edges thereof. The lower pitch end sections are designated by numerals 216 and the cutting edges thereof by the numeral 218. The effect of this construction will in general be similar to Figure 15, the steeply pitched slots of the middle section approximating in their cutting action that of the edges 50 of Figure 5. In this figure also, while not necessarily so, the slots of the cutter and the mid portion of the shear plate are shown as identical and as registering when the cutter is in its mid position.

Figure 17:
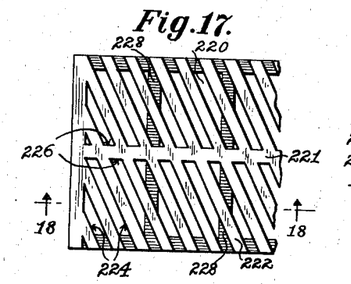
Figure 17 is a fragmentary developed view of a modified form of shear plate provided with strengthening ribs.
Figure 18:
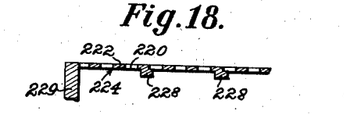
Figure 18 is a sectional view substantially on the line 18—18 of Figure 17 looking in the direction of the arrows.

In Figures 17 and 18 is shown a form of shear plate construction that is particularly useful where it is desired to make the shear plate very thin. As illustrated by way of example the slots, teeth and cutting edges of the shear plate resemble those of Figure 5, but it has added to these features of Figure 5 reinforcements, as will now be fully explained. The numeral 220 designates spiral slots open at their outer ends and closed at their inner ends so as to leave a solid portion 221 in the middle. The spiral slots 220 serve to separate the teeth 222 which are provided with spiral cutting edges 224 along their sides. At 226 are shown cutting edges running at an angle to the spiral cutting edges 224. As illustrated by way of example, these edges run longitudinally of the cutter. At 228 are shown ribs running transversely across the shear plate and uniting several of the spiral teeth 222. These ribs are shown beneath the level of the teeth 222 so as not to obstruct the cutting edges 224. At 229 is indicated a fragment of an arm by which the shear plate may be supported from a hub.

Figure 19:
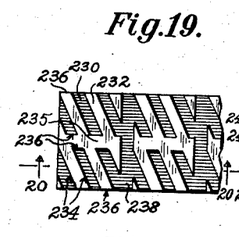
Figure 19 is a fragmentary developed view of a cutter adapted for use with the shear plate of Figure 17.
Figure 20:
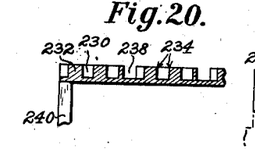
Figure 20 is a transverse sectional view substantially on the line 20—20 of Figure 19.

In Figures 19 and 20 is shown a form of oscillating cutter adapted for use with the shear plate of Figure 17. It is shown as provided with spiral grooves 230 serving to separate the intermediate teeth 232 that are provided with spiral cutting edges 234 along their sides. A rib 235 is shown extending longitudinally of the mid portion of the cutter and serves to separate the cutting area into two lateral sections. The cutting edges 236 extending at an angle to the spiral edges are formed on the edges of this rib 235 and also on the ends of the teeth 232. The cutter is divided into sections by grooves 238 running transversely thereacross and so positioned and dimensioned as to be adapted to receive the ribs 228 of the shear plate of Figures 17 and 18. At 240 is shown a portion of an arm for supporting the cutter on a hub or the like. It will be understood of course that the ribs must be so disposed and dimensioned that free oscillation of the cutter in relation to the shear plate is possible.

Figure 21:
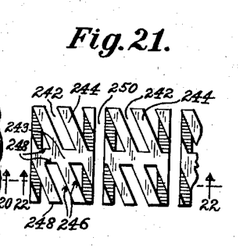
Figure 21 is a fragmentary developed view of another form of cutter adapted for use with the shear plate of Figure 17.
Figure 22:
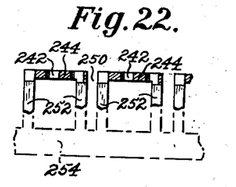
Figure 22 is a transverse sectional view taken substantially on the line 22—22 of Figure 21 looking in the direction of the arrows.

Another form of cutter adapted for use with the shear plate of Figures 17 and 18 is shown in Figures 21 and 22. This cutter is shown as divided into sections spaced from each other, and the ribs 228 of the shear plate of Figures 17 and 18 are adapted for positioning within the spaces between these sections.

In these figures, 242 designates spiral slots running toward the central solid portion 243, and 244 designates teeth intermediate the slots, having spiral edges 246 along the sides thereof. 248 designates edges running at an angle to the spiral, and these edges may be located at the ends of the teeth and also at the inner ends of the slots.

The spaces between the sections of the cutter are designated by the numerals 250 and these spaces are adapted to receive the ribs 228 of the shear plate of Figures 17 and 18. At 254 is shown a hub having pairs of arms 252 thereon, each pair adapted to support one section of the cutting area.

Figure 23:
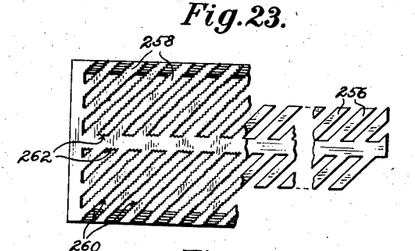
Figures 23, 24 and 25 are respectively fragmentary developed views of modified forms of shear plate and cutter.
Figure 24:
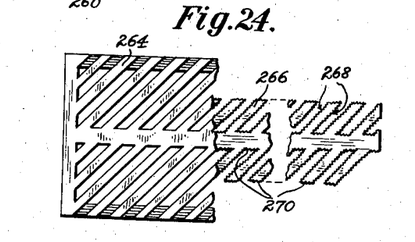
Figure 25:
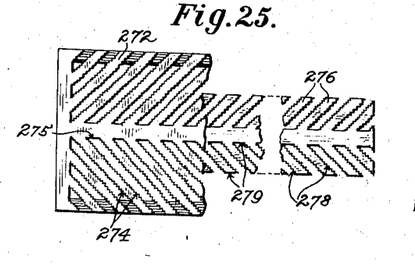

In Figures 23, 24 and 25 I have shown oscillating cutters and shear plates similar to Figure 5 in that they have cutting areas provided with spiral cutting edges, but as an added feature some or all of the cutting edges are serrated.

In Figure 23, the shear plate has serrated spiral cutting edges and other cutting edges at an angle to the spiral that are serrated while all the cutting edges of the cutter are plain.

Figure 24 shows a construction reverse to Figure 23 in that all the cutting edges of the cutter are serrated and all those of the shear plate are plain.

In Figure 25 the spiral cutting edges and both the shear plate and the cutter are serrated while other cutting edges that are angled in relation to the spiral edges are plain.

It will be understood of course that Figures 23, 24, and 25 illustrate only a few of the possible applications of serrated cutting edges to dry shavers of the type herein disclosed.

In Figure 23 the numeral 256 designates the teeth of the cutter and it will be observed that all the cutting edges shown therein are plain. 258 designates the teeth of the shear plate, and it will be observed that the spiral cutting edges 260 located on the sides thereof are serrated. At the inner ends of the slots between the teeth 258 are positioned auxiliary cutting edges in angular relation to the spiral cutting edges and these have been designated by the numeral 262 and it will be observed that they are also shown as serrated.

In Figure 24 the teeth of the shear plate are shown at 264 and all the cutting edges thereon are plain. The teeth 266 of the cutter are shown as provided with serrated spiral cutting edges 268 and with cutting edges at an angle to said spiral edges designated by the numeral 270, these also being serrated.

In Figure 24 the teeth of the shear plate are shown at 264 and all the cutting edges thereon are plain. The teeth 266 of the cutter are shown as provided with serrated spiral cutting edges 268 and with cutting edges at an angle to said spiral edges designated by the numeral 270, these also being serrated.

In Figure 25 the teeth of the shear plate are shown at 272 and the spiral edges 274 thereon are serrated, while the edges 275 at an angle to the spiral edges are plain. The teeth 276 of the cutter are provided with serrated spiral edges 278, while the cutting edges in angular relation to the spiral edges, designated by numeral 279, are plain. It will be observed that in this figure the cutting edges of the two lateral halves of the shear plate and of the cutter are oppositely pitched, and it is to be understood that this construction may be found desirable where the cutting edges are plain as well as where they are serrated.

It will be understood that one of the functions of the serrations is to prevent a sliding or slipping of the hair along the cutting edges. In addition, as will be obvious, the angle of the cut is changed due to the angular relation of the edges of the serrations to the direction of the spiral that determines the general contour of the cutting edges.

Figure 26:
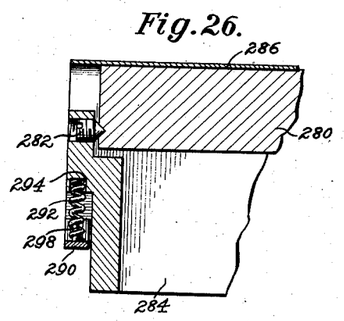
Figure 26 is a fragmentary longitudinal sectional view through a further embodiment of my invention taken substantially on the line 26—26 of Figure 27 looking in the direction of the arrows.
Figure 27:
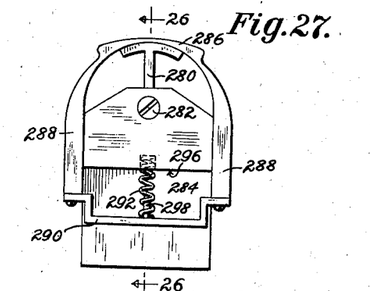
Figure 27 is an end view of the embodiment of Figure 26.
Figure 28:
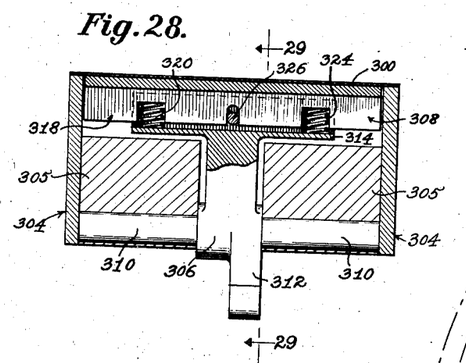
Figure 28 is a longitudinal sectional view of another embodiment of my invention substantially on the broken line 28—28 of Figure 29, looking in the direction of the arrows.
Figure 29:
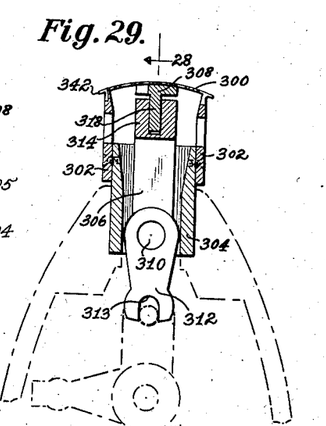
Figure 29 is a transverse sectional view of the embodiment of Figure 28 substantially on the line 29—29 of Figure 28, looking in the direction of the arrows.
Figure 30:
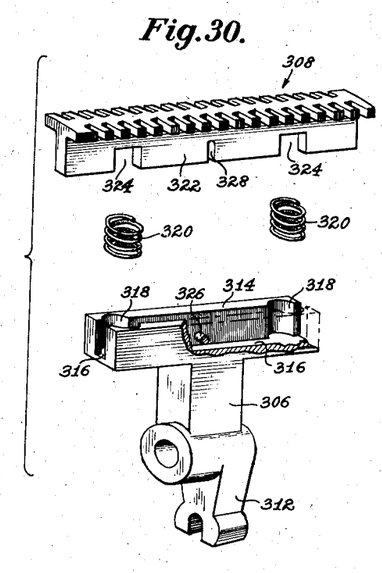
Figure 30 is an exploded view in perspective of the oscillating cutter of the embodiment of Figure 28.

In Figures 26 and 27 I have shown a further embodiment which differs from that of Figure 7 mainly in having a cutter of shorter radius than that of Figure 7 and one that is adapted to swing through a bigger arc and further in that no end plates are provided on the shear plate. A modified construction is also shown for maintaining the shear plate and the cutter in contact, and the shear plate is provided with guard ribs like those shown in the embodiment of Figures 1 to 5. In these figures the numeral 280 designates the cutter mounted for oscillation on trunnions 282 similar to those shown in Figure 7. The body of the shaver head is indicated at 284. The shear plate is shown at 286 and is provided with lateral extensions 288 slidable vertically along the body portion 284, so that the shear plate may move toward the cutter. In order to maintain the shear plate and the cutter in contact I have shown a strap 290 connecting the lateral extensions 288 and positioned underneath the shoulder 296 of the body portion. A coil spring 292 is shown as mounted on the pin 298 carried by the strap 290 and having its upper end located in the recesses 294 provided in the shoulder 296. It will be understood that this spring is under compression so as to cause the shear plate to move towards the cutter. It will be observed that waste discharge can take place freely through the open ends of the shaver head. While the details of the cutting edges of cutter and shear plate have not been illustrated it is to be understood that they may have any of the forms herein disclosed.

Figure 1:
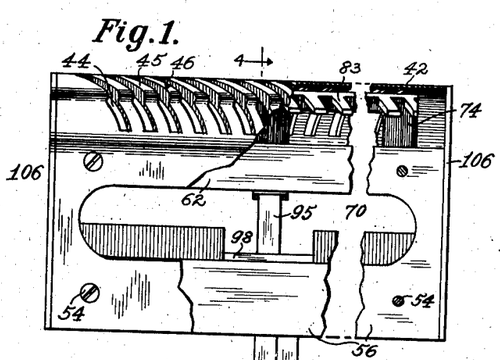
Figure 1 is a fragmentary front elevational view with portions broken away to expose the inner construction, of one embodiment of my invention.

In the embodiment disclosed in Figures 28 to 32, contact of the cutting areas of the cutter and the shear plate is effected by making the cutting portion of the cutter, movable in relation to the main or body portion of the cutter, instead of making the whole cutter movable as in Figure 1 or the whole shear plate movable as in Figures 7 and 26.

In Figures 28 to 32, the numeral 300 designates the shear plate, and this is shown as carried by a pair of lateral members 302 by means of which it is supported on the body 304 in any suitable or preferred manner. At 306 is shown a cutter carrier mounted for oscillation in body portion 304, as on a rock shaft 310 journalled in bearing blocks 305 carried by said body portion and the cutter proper 308 is mounted for sliding movement in the carrier 306. The latter is shown as provided with an extension or arm 312 having a slot 313 therein and a pin fitting into the slot 313 may serve to give the same an oscillating movement.

The cutter carrier is shown as provided with a head 314 slotted longitudinally as indicated at 316, and the slot 316 is shown widened at portions thereof into recesses 318 each adapted to accommodate a coil spring 320 for a purpose that will appear hereinafter.

The cutter proper 308 is shown as provided with a downwardly extending rib 322 adapted to fit slidably into the slot 316. Recesses 324 are provided in this rib 322 and these are adapted to register with the recesses 318 and to accommodate the coil springs 320. When the springs 320 are in position between the cutter 308 and the carrier head 312 they are adapted to press against the bottom of the recesses 318 and against the top walls of the recesss 324 and to tend to separate the cutter 308 from the head 312. A pin 326 is shown as running transversely across the slot 316 and as adapted to pass through a slot 328 in the rib 322 of the cutter 308, so as to prevent lateral displacement thereof without interfering with its upward movement in the slot 316.

It will therefore be understood that when the cutter 308 is mounted in the carrier 306 the springs 320 will tend to move the cutter away from the carrier and, when the device is assembled, will assure contact of the cutting areas of the cutter and the shear plate.

Figure 31:
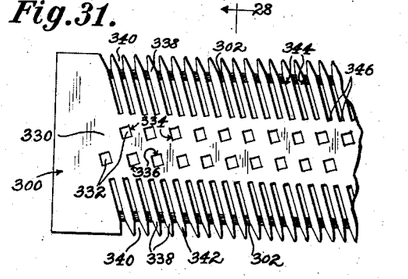
Figure 31 is a developed view of the shearplate of the embodiment of Figure 28.

The details of the configuration of the shear plate, in an illustrative embodiment, will be found in Figure 31, and it may be stated to comprise three areas or zones, a mid portion 330 provided with openings 332 therein, and a pair of lateral comb like portions provided with spirally extending teeth 338 separated by slots 340 open at one end. I have illustrated these openings 332 as having spirally disposed cutting edges 334 on the side walls thereof, although it will be understood that features of my invention may be attained even though the spiral arrangement is not here employed. Other cutting edges disposed at an angle to the cutting edges 334 are shown at 336. In the particular disclosure of Figure 31 the edges 336 are shown at right angles to the edges 334, however, only for illustrative purposes. The teeth 338 are shown as provided with outer guard portions 342 formed by an outward widening or flaring of the slots 340, and these guard portions are shown as overhanging the walls 302 and serve the purpose of gathering as many hairs as possible in the wide entrance portions of the slots.

The spiral cutting edges running along the sides of the teeth 338 are designated by the numeral 344 and the cutting edges running at an angle thereto at the inner ends of the slots are designated by numeral 346. As shown by way of example in Figure 31 the cutting edges 346 are shown at right angles to the spiral edges 344, although they are not necessarily so disposed.

It will be observed that the shear plate as shown in Figure 31 has a pair of openings 332 positioned between and in spiral alignment with a pair of slots 340 and that intermediate each such row of spirally aligned slots 340 and openings 332, is a pair of spirally aligned slots 340 having no openings 332 therebetween.

Figure 32:
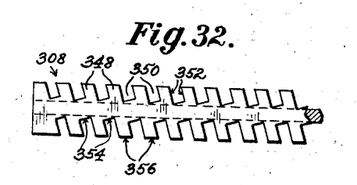
Figure 32 is a developed view of the cutter of the embodiment of Figure 28.

The arrangement of the cutting edges of the cutter 308 are shown in detail in Figure 32 in an illustrative embodiment thereof. It will be observed that the cutting teeth 348 are shown as separated by slots 350 and that spiral cutting edges 352 are provided on the edges of the teeth 348 while cutting edges 354 are formed on the inner edges of the slots 50 and cutting edges 354 are formed on the inner edges of the slots 350 and cutting edges 356 are provided at the ends of the teeth 348. The edges 354 and 356 are disposed at an angle to the spiral edges 352. As shown in the illustrative embodiment of Figure 32 the edges 354 extend at a right angle to the spiral edges 352 while the edges 356 are shown as extending in a longitudinal direction.

While I have herein disclosed several illustrative embodiments of my invention and described the manner of their use, it will be understood that my invention may be embodied in many other forms without departing from the spirit thereof, as will be obvious to those skilled in the art, and that the disclosure herein is by way of illustration merely and is not to be interpreted in a limiting sense, and that I do not limit myself other than as called for by the prior art.

In each of the embodiments herein illustrated and described, there is disclosed the association with other features of invention of the feature relating to the spiral formation of the cutting edges. This has been done only for convenience of disclosure, and it will be understood that there are numerous features of invention herein disclosed which serve advantageously even though associated with cutting teeth which do not employ the spiral formation. It will therefore be understood that the spiral formation is not to be considered as an essential feature, unless the language of the claims specifically so state.

Having thus described my invention and illustrated its use, what I claim as new and desire to secure by Letters Patent is:

1. In a dry shaver, a pair of relatively movable coacting cutting members, at least one of said members having a cutting edge disposed at an angle other than a right angle to the direction of relative movement and another cutting edge disposed at a different angle other than a right angle to the direction of relative movement, and the other of said members having a cutting edge disposed at an angle other than a right angle to the direction of relative movement.

2. In a shaving device, a pair of relatively movable cutting members, at least one of said members having a cutting area spaced from another cutting area, and each of said cutting areas being provided with at least one cutting edge positioned at an angle other than a right angle to the direction of relative movement and at least one cutting edge at a different angle other than a right angle to the direction of relative movement.

3. In a dry shaver a shear plate having cutting zones thereon, said cutting zones being traversed by spiral slots the pitch of which is different for different zones.

4. In a dry shaver a shear plate having two cutting areas and an intermediate solid portion and spiral slots traversing said cutting areas and having spiral cutting edges on the walls thereof and the spiral slots of one of said cutting areas differing in pitch from the spiral slots of the other.

5. In a dry shaver, a cutter provided with a cutting surface and means for pivotally mounting said cutting surface for oscillation, said means being disposed substantially in a plane containing the axis of oscillation and said cutting surface being traversed by spiral slots extending to both sides of said supporting means.

6. In a dry shaver, a cutter provided with a cutting surface and means for pivotally mounting said cutting surface for oscillation, said means being disposed substantially in a plane containing the axis of oscillation and said cutting surfaces being traversed by spiral slots disposed to one side only of said supporting means.

7. In a dry shaver, a cutter provided with cutting areas and means for pivotally mounting said cutting areas for oscillation, said means being disposed substantially in a plane containing the axis of oscillation and said cutting areas being disposed on both sides of said supporting means, and each being traversed by spiral slots disposed on both sides of said supporting means.

8. In a dry shaver a cutter having cutting areas and means for mounting the same for oscillation, said means being disposed substantially in spaced planes extending transversely to the axis of movement of the cutter, and said cutting areas being disposed intermediate said mounting means and being constituted by portions having spiral cutting edges therein.

9. In a dry shaver a cutter having cutting areas and means for mounting the same for oscillation, said means being disposed substantially in spaced planes extending transversely to the axis of movement of the cutter, and cutting areas disposed entirely outside of said mounting means and comprising portions having spiral cutting edges therein.

10. A dry shaver having a relatively oscillatable shear plate and cutter, both shear plate and cutter being traversed by spiral slots having cutting edges on the walls thereof and the slots of the cutter being staggered in relation to the slots of the shear plate when the cutter is in its mid position of oscillation.

11. In a dry shaver a shear plate having two lateral cutting zones and an intermediate solid portion, spiral slots of the same pitch and spacing traversing said lateral cutting zones, but the spiral slots of one zone being staggered in relation to the other zone.

12. A shaving head comprising a body having lateral walls, an arched flesh-engaging shear plate carried by said walls, a member mounted for slidable movement in the space between said walls, a cutter mounted for oscillation in said member, and means for urging said member toward the shear plate, whereby contact between the cutter and the shear plate will be effected, and said shear plate and said cutter being provided with spiral cutting edges of the same pitch adapted to cooperate in a clipping action.

13. A shaver head comprising a body portion, a cutter mounted for oscillation in said body portion, an arched flesh-engaging shear-plate mounted on said body portion for sliding movement toward and away from said cutter, means for oscillating said cutter, and means for urging said shear plate into contact with said cutter.

14. A shaver head comprising a body portion, a cutter mounted for oscillation in said body portion, an arched, flesh-engaging shear-plate mounted on said body portion for sliding movement toward and away from said cutter, and means for urging said shear plate into contact with said cutter, said last-named means comprising a resilient member intermediate portions of said shear plate and said body portion.

15. In a dry shaver head, an arched flesh-engaging shear-plate, a member mounted for oscillation in relation to said shear-plate, and a cutter mounted on said member so that it is free to slide toward said shear-plate, and said shear-plate and said cutter being provided with spiral cutting edges having the same pitch.

16. A dry shaver head comprising a body portion, an arcuate flesh-engaging shear plate, a member slidably mounted in said body portion, a cutter oscillatably mounted in said member, an element mounted for oscillation in said body portion, and toothed interengaging portions between said cutter and said element.

17. In a dry shaver, a face-engaging cutting member provided with an intermediate portion having apertures therein, two of the sides of which are parallel to each other and have cutting edges thereon that form portions of spirals, and said cutting member further being provided with lateral portions traversed by inwardly directed slots the side walls of which have cutting edges thereon that are also portions of spirals.

18. In a dry shaver, a face-engaging cutting member provided with an intermediate portion having apertures therein, two of the sides of which are parallel to each other and have cutting edges thereon that form portions of spirals, and said cutting member further being provided with lateral portions traversed by inwardly directed slots the side walls of which have cutting edges thereon that are portions of spirals, and said apertures having cutting edges on sides disposed at an angle to said spiral cutting edges thereof, and said slots having cutting edges on the inner ends thereof disposed at an angle to the spiral cutting edges thereof.

19. In a dry shaver a cutter provided with teeth separated by outwardly opening slots, similar spiral cutting edges formed on the sides of said slots, and cutting edges disposed at an angle to said spiral cutting edges, and positioned on the ends of said teeth and at the inner ends of said slots, said edges on the ends of said teeth being disposed in the direction of the axis of said spiral edges, and said edges at the inner ends of the slots being disposed at an angle to said edges on the ends of the teeth.

GODFREY DALKOWITZ.